(12) United States Patent
Tashiro et al.

(10) Patent No.: US 10,864,871 B2
(45) Date of Patent: Dec. 15, 2020

(54) IMPACT ABSORPTION STRUCTURE FOR VEHICLES

(71) Applicant: MAZDA MOTOR CORPORATION, Hiroshima (JP)

(72) Inventors: Kuniyoshi Tashiro, Hiroshima (JP); Ippei Kuroda, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/346,610

(22) PCT Filed: Oct. 11, 2017

(86) PCT No.: PCT/JP2017/036845
§ 371 (c)(1),
(2) Date: May 1, 2019

(87) PCT Pub. No.: WO2018/088098
PCT Pub. Date: May 17, 2018

(65) Prior Publication Data
US 2019/0283697 A1  Sep. 19, 2019

(30) Foreign Application Priority Data

Nov. 8, 2016 (JP) ................. 2016-217957

(51) Int. Cl.
*B60R 19/34* (2006.01)
*F16F 7/12* (2006.01)
*B62D 25/08* (2006.01)
*B62D 21/15* (2006.01)

(52) U.S. Cl.
CPC ............ *B60R 19/34* (2013.01); *B62D 21/152* (2013.01); *B62D 25/082* (2013.01); *B62D 25/088* (2013.01); *F16F 7/12* (2013.01)

(58) Field of Classification Search
CPC .......... B60R 19/34; B62D 21/152; F16F 7/12; F16F 7/003
USPC ............ 293/133; 296/187.09, 187.1, 203.01, 296/203.02
See application file for complete search history.

(56) References Cited

U.S. PATENT DOCUMENTS

2015/0035316 A1*  2/2015  Kuriyama ............ B62D 25/082
296/187.1

FOREIGN PATENT DOCUMENTS

| EP | 1688312 A1 | 8/2006 |
| JP | 2002-012109 A | 1/2002 |
| JP | 2006-347262 A | 12/2006 |
| JP | 2015-091710 A | 5/2015 |
| WO | 2016/148635 A1 | 9/2016 |

OTHER PUBLICATIONS

International Search Report issued in PCT/JP2017/036845; dated Nov. 7, 2017.

* cited by examiner

*Primary Examiner* — Dennis H Pedder
(74) *Attorney, Agent, or Firm* — Studebaker & Brackett PC

(57) ABSTRACT

When viewed from the vehicle front and rear direction, the front end portions of the upper plate part 21, the lower plate part 22, the left plate part 23, and the right plate part 24 of the left front side frame 2 and the rear end portions of the upper wall part 41, the lower wall part 42, the left wall part 43, and the right wall part 44 of the left crush can 4 overlap each other.

3 Claims, 12 Drawing Sheets

(RIGHT)INNER ← VEHICLE WIDTH DIRECTION → OUTER(LEFT)

(RIGHT)INNER ← VEHICLE WIDTH DIRECTION → OUTER(LEFT)

IMPACT ABSORPTION STRUCTURE FOR VEHICLES

TECHNICAL FIELD

The present disclosure relates to an impact absorption structure provided in a vehicle, and more particularly, belongs to a technical field of a structure of absorbing energy by crushing and deforming in a vehicle front and rear direction when an impact load is applied from the vehicle front and rear direction.

BACKGROUND ART

In general, on the front part of an automobile, a front side frame is disposed on each of right and left sides of the front part to extend in a front and rear direction of the automobile. Crush cans are attached to the front end portions of these front side frames so as to absorb energy by crushing and deforming in the front and rear direction when an impact load is applied from the front of the automobile. Moreover, a bumper beam is fixed to the front end portions of the right and left crush cans so as to extend in a width direction of the automobile (for example, see PATENT DOCUMENT 1).

In the structure disclosed in PATENT DOCUMENT 1, an outer shape of the crush can is smaller than an inner shape of the front end portion of the front side frame. A rear end portion of the crush can is inserted into the front end portion of the front side frame, three cores are inserted into the crush can, and the three members of the core, the rear end portion of the crush can, and the front end portion of the front side frame are co-fastened by a plurality of bolts and nuts.

Furthermore, the crush can of PATENT DOCUMENT 1 is provided therein with an upper horizontal wall part and a lower horizontal wall part, an upper vertical wall part extending from an upper wall part to the upper horizontal wall part of the crush can, and a lower vertical wall part extending from a lower wall part of the crush can to the lower horizontal wall part.

CITATION LIST

Patent Document

PATENT DOCUMENT 1: Japanese Unexamined Patent Publication No. 2006-347262

SUMMARY OF THE INVENTION

Technical Problem

PATENT DOCUMENT 1 discloses the upper horizontal wall part, the lower horizontal wall part, the upper vertical wall part, and the lower vertical wall part provided inside the crush can. This structure could control energy absorption by the crushing and deforming of the crush can and thus minimize damage to the front side frame and the like at the time of a light collision, which is the expected purpose of the crush can, while ensuring support stiffness of the bumper beam.

However, in PATENT DOCUMENT 1, the three cores are inserted into the crush can and each of the cores is fastened by two sets of bolts and nuts, resulting in a significant increase in the number of parts and an increase in a weight of the crush can.

Furthermore, in order to fully perform the function of the crush can, it is necessary to firmly support the crush can at the rear end portion thereof from the beginning to the end of the crushing and deforming. However, in the case of PATENT DOCUMENT 1, since the cores are provided only on the outside in the width direction of the automobile in a space above the upper horizontal wall part of the crush can and a space below the lower horizontal wall part, there is no core inside the width direction of the automobile. Accordingly, the outside of the crush can in the width direction of the automobile is firmly fixed to the front side frame relative to the inside, and when an impact load is applied from the front, since the crush can may be displaced in an unexpected direction according to the degree and direction of the impact, the expected energy absorption performance of the crush can may not be exhibited.

The present invention has been made to solve the aforementioned problems, and an object of the present invention is to exhibit expected energy absorption performance by firmly and stably supporting a crush can at a front side frame while reducing the number of parts and a weight of the crush can.

Solution to the Problem

In order to achieve the aforementioned object, in the present invention, when viewed from the vehicle front and rear direction, a rear end portion of a crush can and a front end portion of a front side frame are disposed to overlap each other, so that an upper portion and a lower portion of the rear end portion of the crush can be firmly supported by an upper portion and a lower portion of the front end portion of the front side frame when an impact load is applied.

The first invention is directed to an impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein each of the crush cans includes an extrusion molding member having an upper wall part and a lower wall part extending in a vehicle right and left direction while being separated from each other in a vertical direction, a left wall part extending in the vertical direction to connect vehicle left end portions of the upper wall part and the lower wall part to each other, and a right wall part extending in the vertical direction to connect vehicle right end portions of the upper wall part and the lower wall part to each other, the crush can is provided therein with an upper horizontal wall part and a lower horizontal wall part extending from the right wall part to the left wall part and spaced apart from each other in the vertical direction, an upper vertical wall part extending from the upper wall part to the upper horizontal wall part in the vertical direction, and a lower vertical wall part extending from the lower wall part to the lower horizontal wall part in the vertical direction, the front side frame is provided at the front end portion thereof with an upper plate part and a lower plate part extending in the vehicle right and left direction while being separated from each other in the vertical direction, a left plate part extending in the vertical direction to connect vehicle left end portions of the upper plate part and the lower plate part to each other, and a right plate part extending in the vertical direction to connect vehicle right end portions of the upper plate part and the lower plate part to each other, and when viewed from the vehicle front and rear direction, the vehicle front end portions of the upper plate part, the lower plate part, the left plate part, and the right plate part of the front side frame and vehicle rear end portions of the upper wall part, the lower wall part, the left wall part, and the right wall part of the crush can are disposed to overlap each other.

According to such a configuration, ridge line portions are formed at two portions of the upper portion of the front end portion of the front side frame by the upper plate part and the left wall part/the right wall part, and ridge line portions are formed at two portions of the lower portion thereof by the lower plate part and the left wall part/the right wall part. Since the strength of the ridge line portions is higher than that of a flat plate portion, the strength of the upper portion and the lower portion of the front end portion of the front side frame is increased.

On the other hand, similarly to the front end portion of the front side frame, since ridge line portions are formed at two portions of the upper portion and two portions of the lower portion of left crush can, the strength of the upper portion and the lower portion of the crush can is increased. Moreover, the strength of the upper portion of the crush can is further increased by the upper horizontal wall part and the upper vertical wall part, and the strength of the lower portion of the crush can is also further increased by the lower horizontal wall part and the lower vertical wall part.

Furthermore, the front end portions of the upper plate part, the lower plate part, the left plate part, and the right plate part of the front side frame and the rear end portions of the upper wall part, the lower wall part, the left wall part, and the right wall part of the crush can overlap each other, thereby obtaining a positional relation in which a high-strength portion of the upper portion of the front side frame and a high-strength portion of the upper portion of the crush can correspond to each other and a positional relation in which a high-strength portion of the lower portion of the front side frame and a high-strength portion of the lower portion of the crush can correspond to each other. In this way, when an impact load is applied to the crush can via the bumper beam, since the rear end portion of the crush can is able to be firmly and stably supported at the front end portion of the front side frame, a plurality of cores are not required as in the related art and the crush can is prevented from being displaced in an unexpected direction, so that expected energy absorption performance of the crush can is exhibited.

In the second invention, intermediate portions of the left plate part and the right plate part of the front side frame are provided with recessed linear portions recessed toward an inner side of the front side frame and extending in the vehicle front and rear direction, and the recessed linear portions are disposed at an approximately the same height as the upper horizontal wall part and the lower horizontal wall part of the crush can.

According to such a configuration, since the recessed linear portions of the left plate part and the right plate part of the front side frame act like a rib, the left plate part and the right plate part are reinforced by the shape of the recessed linear portion. Since the recessed linear portions have approximately the same heights as the upper horizontal wall part and the lower horizontal wall part of the crush can, when an impact load is applied from the front, the upper horizontal wall part and the lower horizontal wall part of the crush can are supported by the formation portions of the recessed linear portions, which are high strength portions of the front side frame. In this way, the rear end portion of the crush can is more firmly supported by the front end portion of the front side frame.

In the third invention, the front end portion of the front side frame and the rear end portion of the crush can have an approximately rectangular cross-section that is long in the vertical direction, and when viewed from the vehicle front and rear direction, ridge line portions formed at four portions of the front end portion of the front side frame and ridge line portions formed at four portions of the rear end portion of the crush can overlap each other.

According to such a configuration, since the ridge line portions of the front side frame and the ridge line portions of the crush can are high strength portions and the high strength portions are in a positional relation so as to correspond to each other, the rear end portion of the crush can is more firmly supported by the front end portion of the front side frame.

In the fourth invention, an outer shape of the vehicle front end portion of the front side frame and an outer shape of the vehicle rear end portion of the crush can approximately coincide with each other.

According to such a configuration, when an impact load is applied from the front, since a wide range of the rear end portion of the crush can is supported by the front end portion of the front side frame, the rear end portion of the crush can is more firmly supported by the front end portion of the front side frame.

Advantages of the Invention

According to the first invention, since high-strength portions of the upper portion and the lower portion of the front side frame and high-strength portions of the upper portion and the lower portion of the crush can are in a positional relation so as to correspond to each other, it is possible to firmly and stably support the rear end portion of the crush can at the front end portion of the front side frame. In this way, a plurality of cores are not required as in the related art, so that it is possible to reduce the number of parts and to exhibit expected energy absorption performance while reducing a weight of the crush can.

According to the second invention, since the recessed linear portions formed in the front side frame have approximately the same heights as the upper horizontal wall part and the lower horizontal wall part of the crush can, it is possible to reliably the upper horizontal wall part and the lower horizontal wall part of the crush can by the front end portion of the front side frame and to crush the crush can as desired.

According to the third invention, it is possible to more firmly support the rear end portion of the crush can by the front end portion of the front side frame.

According to the fourth invention, since the outer shape of the front end portion of the front side frame and the outer shape of the rear end portion of the crush can approximately coincide with each other, it is possible to support a wide range of the rear end portion of the crush can by the front end portion of the front side frame, and to stabilize the crush can when an impact load is applied.

DESCRIPTION OF EMBODIMENTS

Hereinafter, an embodiment of the present invention will be described in detail with reference to the drawings. The following description of a preferred embodiment is merely exemplary and is not intended to limit the present invention, applications thereof, or usages thereof.

Figure 1:
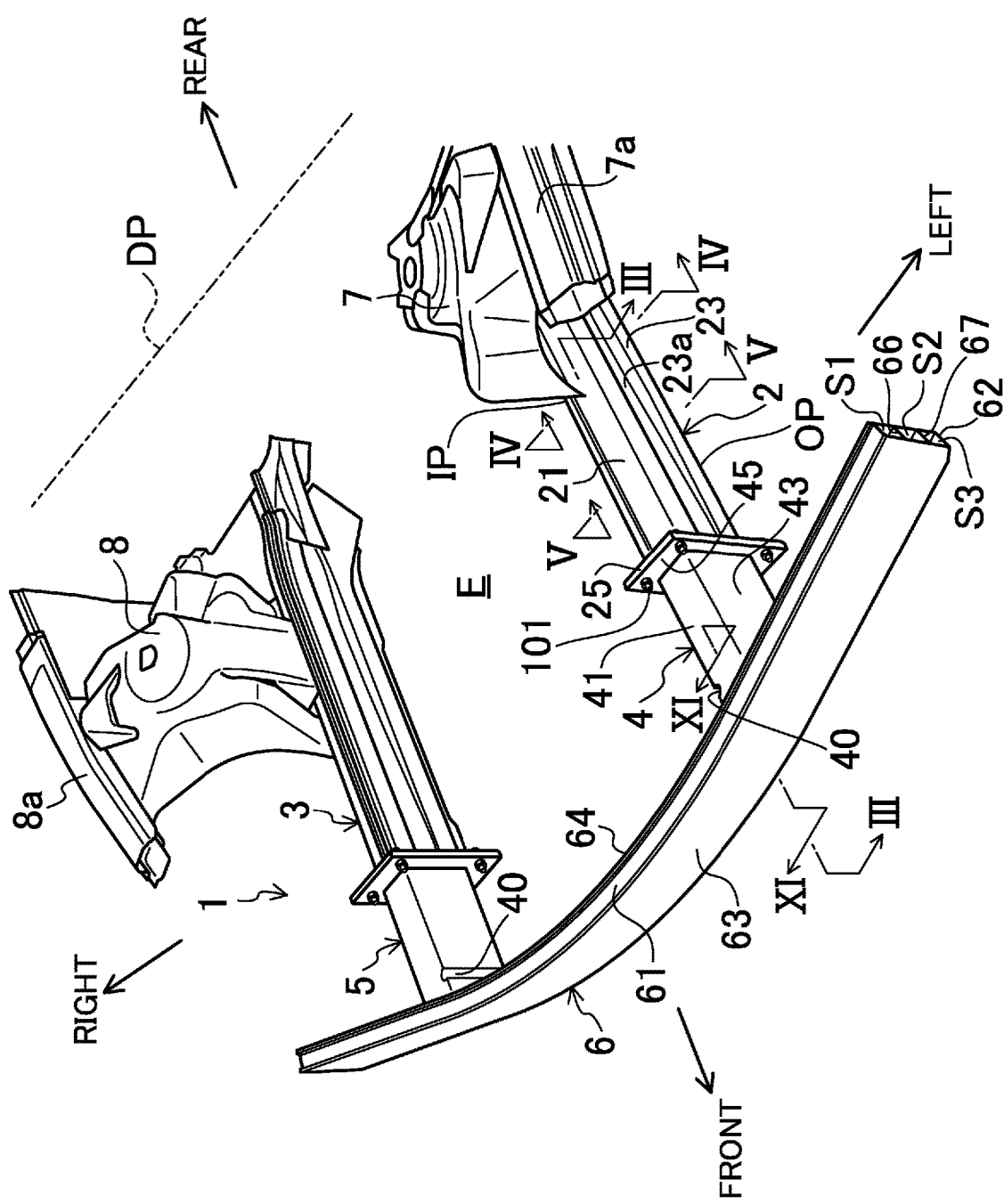
FIG. 1 is a perspective view when an impact absorption structure for a vehicle according to an embodiment of the present invention is viewed from the upper left.

FIG. 1 is a perspective view when an impact absorption structure 1 of a vehicle according to an embodiment of the present invention is viewed from an obliquely upper left. The impact absorption structure 1 is provided, for example, at the front part of a passenger vehicle, and includes a left front side frame 2, a right front side frame 3, a left crush can 4, a right crush can 5, and a bumper beam 6 extending in a vehicle width direction. The left crush can 4 and the right crush can 5 are attached to the front end portions of the left front side frame 2 and the right front side frame 3, respectively. The bumper beam 6 is attached to the front end portions of the left crush can 4 and the right crush can 5. In the embodiment, it is assumed that the front side of the vehicle is simply referred to as "front", the rear side of the vehicle is simply referred to as "rear", the left side of the vehicle is simply referred to as "left", and the right side of the vehicle is simply referred to as "right".

The left front side frame 2 and the right front side frame 3 are disposed on the left side and right side of a vehicle body, respectively, and extend in a front and rear direction while being separated from each other in a right and left direction. Between the left front side frame 2 and the right front side frame 3, an engine, a transmission and the like (not illustrated) are disposed. Furthermore, the vehicle is provided with a dash panel DP (its schematic shape is indicated by a virtual line) that divides an engine compartment E and a passenger compartment (not illustrated). The dash panel DP extends approximately vertically. The left front side frame 2 extends to the front from the vicinity of the lower left side of the dash panel DP, and the right front side frame 3 extends to the front from the vicinity of the lower right side of the dash panel DP.

The front part of the vehicle is provided with a left suspension tower 7 formed in a tower shape on a left side of the left front side frame 2 and a right suspension tower 8 formed in a tower shape on a right side of the right front side frame 3. The sides of the left suspension tower 7 and the right suspension tower 8 are provided with reinforcements 7a and 8a, respectively.

Furthermore, the vehicle is provided with a front bumper, a fender, an engine hood, and the like, but they are not illustrated.

(Configuration of Front Side Frame)

Figure 3:
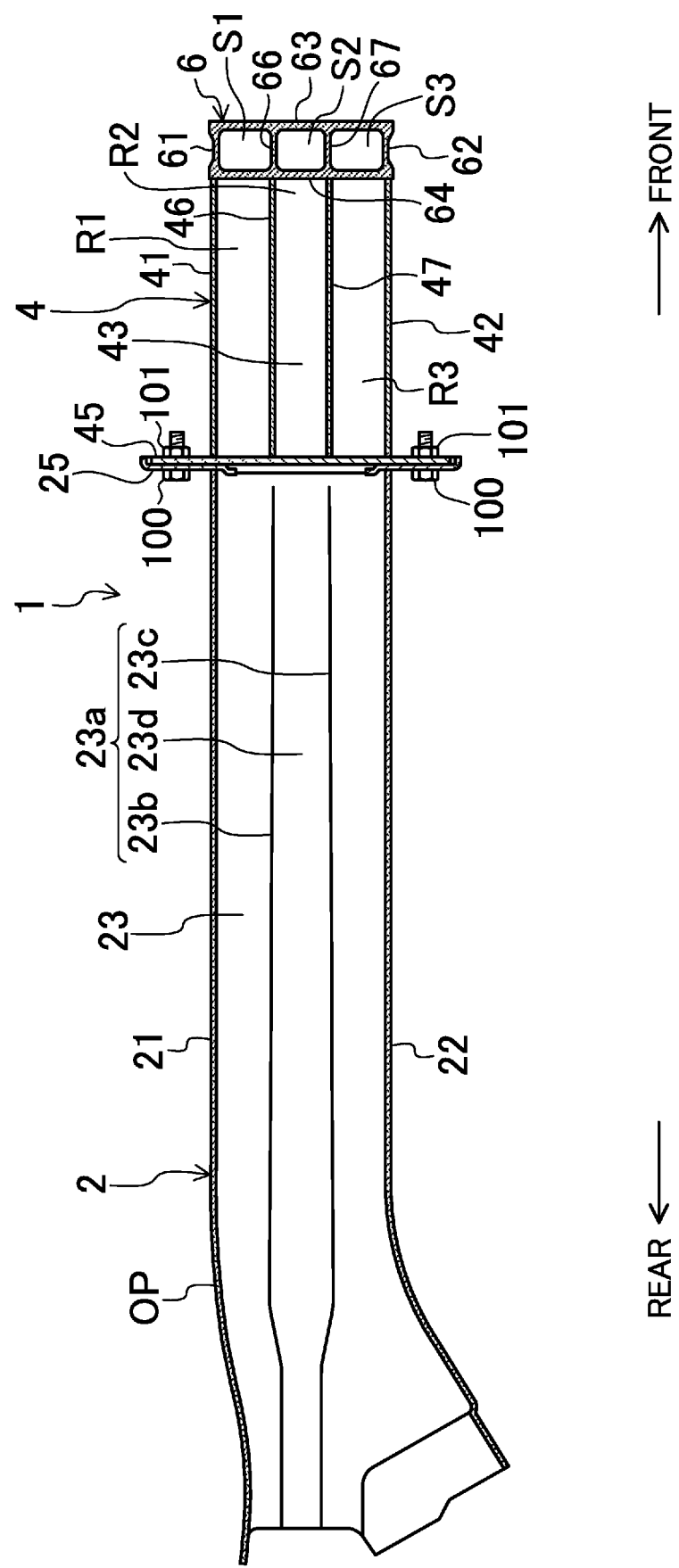
FIG. 3 is a cross-section taken along line in FIG. 1.
Figure 4:
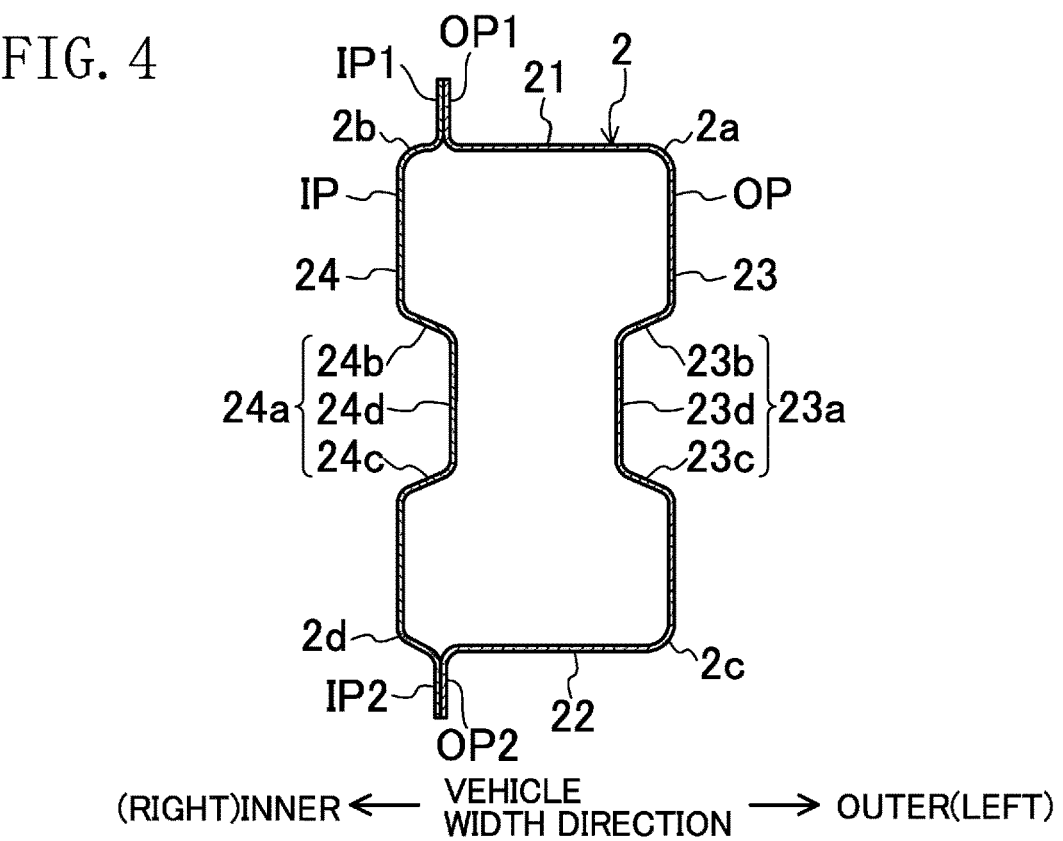
FIG. 4 is a cross-section taken along line IV-IV in FIG. 1.
Figure 5:
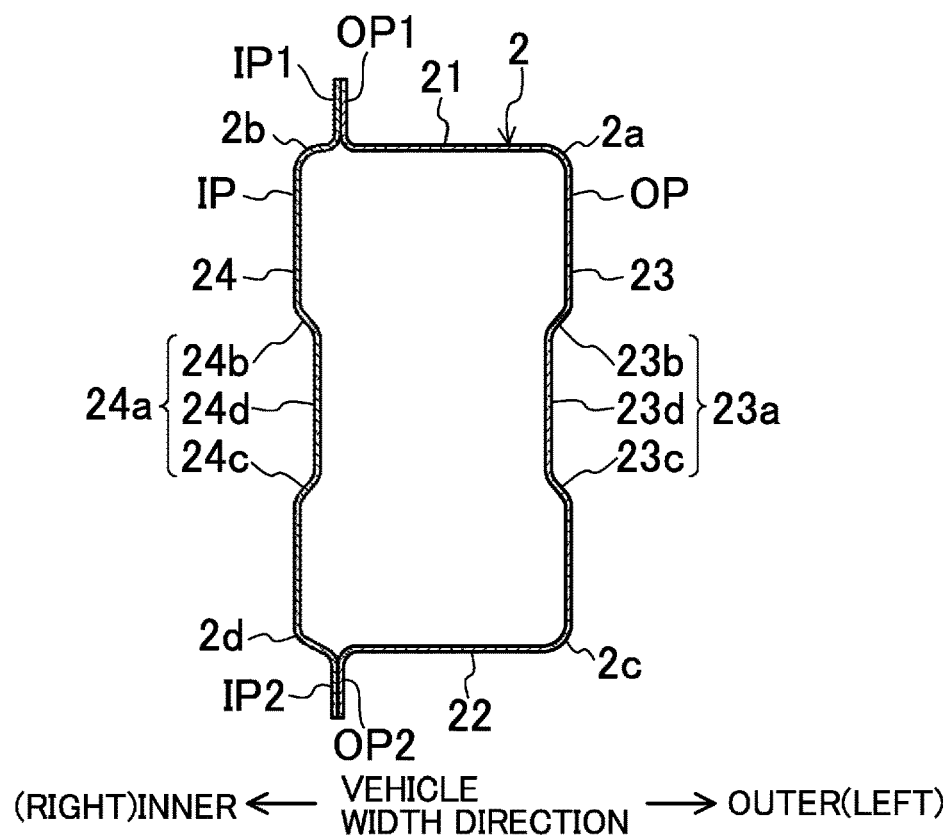
FIG. 5 is a cross-section taken along line V-V in FIG. 1.

Since the left front side frame 2 and the right front side frame 3 are symmetrical in the right and left direction, the structure of the left front side frame 2 will be described in detail below. As illustrated in FIG. 3 to FIG. 5, the left front side frame 2 has an upper plate part 21 and a lower plate part 22 extending in the right and left direction while being separated from each other in the vertical direction, a left plate part 23 extending in the vertical direction to connect the left end portions of the upper plate part 21 and the lower plate part 22 to each other, and a right plate part 24 extending in the vertical direction to connect the right end portions of the upper plate part 21 and the lower plate part 22 to each other, and has an approximately rectangular cross-section as a whole. The dimensions of the left plate part 23 and the right plate part 24 in the vertical direction are set larger than those of the upper plate part 21 and the lower plate part 22 in the right and left direction.

As illustrated in FIG. 3, the upper plate part 21 extends approximately horizontally from the front end portion to the rear end portion of the left front side frame 2. The lower plate part 22 extends from the front end portion to the vicinity of the rear end portion of the left front side frame 2 in approximately parallel to the upper plate part 21, but the vicinity of the rear end portion of the lower plate part 22 is curved and extends to the rear side from the vicinity of the rear end portion of the lower plate part 22 to the rear end portion while being inclined downward. As illustrated in FIG. 4 and FIG. 5, the left plate part 23 constitutes an outer part of the left front side frame 2 in the vehicle width direction, and the right plate part 24 constitutes an inner part of the left front side frame 2 in the vehicle width direction.

The left plate part 23 is provided with an outer recessed linear portion 23a for reinforcement. The outer recessed liner portion 23a is formed in the intermediate portion of the left plate part 23 in the vertical direction, and recessed toward an inner side (right side) of the left front side frame 2 and extending in the front and rear direction. The outer recessed linear portion 23a is recessed toward the inner side of the left front side frame 2, so that it is possible to reinforce the left front side frame 2 without narrowing a lateral space of the left front side frame 2.

The outer recessed linear portion 23a is not formed at a front end portion of the left plate part 23, and extends continuously from a rear portion, other than the front end portion of the left plate part 23, to a rear end portion of the left plate part 23. The depth of the outer recessed linear portion 23a is set shallower toward a front end portion of the outer recessed linear portion 23a and deeper toward a rear end portion of the outer recessed linear portion 23a. The depth of the outer recessed linear portion 23a is a dimension of the outer recessed linear portion 23a in the right and left direction. Furthermore, a dimension of the outer recessed linear portion 23a in the vertical direction is set approximately constant from the front end portion to the rear end portion of the outer recessed linear portion 23a, and in the embodiment, the dimension of the outer recessed linear portion 23a in the vertical direction corresponds to about ⅓ of a dimension of the left front side frame 2 in the vertical direction and is approximately equal to a separation dimension in the vertical direction of an upper horizontal wall part 46 and a lower horizontal wall part 47 of the crush can 4 to be described later.

Although illustrated only in FIG. 4 and FIG. 5, the outer recessed linear portion 23*a* includes an upper portion 23*b* and a lower portion 23*c* projecting to the inner side of the left front side frame 2, and an intermediate plate portion 23*d* vertically extending from a distal end portion (right end portion) of the upper portion 23*b* in the projecting direction to a distal end portion (right end portion) of the lower portion 23*c* in the projecting direction. A separation dimension between the upper portion 23*b* and the lower portion 23*c* corresponds to the dimension of the outer recessed linear portion 23*a* in the vertical direction. The upper portion 23*b* is inclined to be located lower toward the right end portion. Furthermore, the lower portion 23*c* is inclined to be located upper toward the right end portion.

The right plate part 24 is provided with an inner recessed linear portion 24*a* for reinforcement. The inner recessed liner portion 24*a* is formed in the intermediate portion of the right plate part 24 in the vertical direction, and recessed toward an inner side (left side) of the left front side frame 2 and extending in the front and rear direction. The inner recessed linear portion 24*a* is not formed at a front end portion of the right plate part 24, and extends continuously from a rear portion, other than the front end portion of the right plate part 24, to a rear end portion of the right plate part 24. That is, since the inner recessed linear portion 24*a* and the outer recessed linear portion 23*a* are not formed at the front end portion of the left front side frame 2, the front end portion of the left front side frame 2 has an approximately rectangular cross-section that is long in the vertical direction. In this way, the upper portion of the front end portion of the left front side frame 2 is provided with two ridge line portions 2*a* and 2*b* spaced apart from each other in the right and left direction, and the lower portion of the front end portion of the left front side frame 2 is provided with two ridge line portions 2*c* and 2*d* spaced apart from each other in the right and left direction. The ridge line portions 2*a* to 2*d* are continuous from the front end portion to the rear end portion of the left front side frame 2. The portions where the ridge line portions 2*a* to 2*d* are formed have a higher strength than that of a flat plate portion of the left front side frame 2.

The depth of the inner recessed linear portion 24*a* is set shallower toward a front end portion of the inner recessed linear portion 24*a* and deeper toward a rear end portion of the inner recessed linear portion 24*a*. Furthermore, a dimension of the inner recessed linear portion 24*a* in the vertical direction is set to be the same as the dimension of the outer recessed linear portion 23*a* in the vertical direction.

Similar to the outer recessed linear portion 23*a*, the inner recessed linear portion 24*a* includes an upper portion 24*b* and a lower portion 24*c* projecting to the inner side of the left front side frame 2, and an intermediate plate portion 24*d* extending from a distal end portion (left end portion) of the upper portion 24*b* in the projecting direction to a distal end portion (left end portion) of the lower portion 24*c* in the projecting direction. The upper portion 24*b* is inclined to be located lower toward the left end portion. Furthermore, the lower portion 24*c* is inclined to be located upper toward the left end portion.

The left front side frame 2 includes an outer panel OP and an inner panel IP joined together. The outer panel OP is disposed on an outer side in the vehicle width direction, and the inner panel IP is disposed on an inner side in the vehicle width direction. The outer panel OP and the inner panel IP, for example, are obtained by press-molding a steel plate and the like. Joining flanges OP1 and OP2 are formed on an upper part and a lower part of the outer panel OP, joining flanges IP1 and IP2 are formed on an upper part and a lower part of the inner panel IP, the joining flange OP1 and the joining flange IP1, for example, are joined together by spot welding, and the joining flange OP2 and the joining flange IP2, for example, are joined together by the spot welding. A joining position of the outer panel OP and the inner panel IP is inside (right side) from the center of the left front side frame 2 in the vehicle width direction.

As illustrated in FIG. 3, a frame-side set plate 25 is fixed to the front end portion of the left front side frame 2 so as to extend in the vertical direction. The frame-side set plate 25 is formed to be larger than the outer shape of the front end portion of the left front side frame 2, and is a member for attaching the crush can 4. Similarly, a frame-side set plate 35 is fixed to the front end portion of the right front side frame 3.

(Configuration of Crush can)

Since the left crush can 4 and the right crush can 5 are symmetrical in the right and left direction, the structure of the left crush can 4 will be described in detail below. As illustrated in FIG. 6 to FIG. 9, the left crush can 4 includes an extrusion molding member having an upper wall part 41 and a lower wall part 42 extending in the right and left direction while being separated from each other in the vertical direction, a left wall part 43 extending in the vertical direction to connect the left end portions of the upper wall part 41 and the lower wall part 42 to each other, and a right wall part 44 extending in the vertical direction to connect the right end portions of the upper wall part 41 and the lower wall part 42 to each other. The extrusion molding member, for example, is a member molded by extruding a material such as an aluminum alloy and a magnesium alloy from a cap (not illustrated).

The dimensions of the left wall part 43 and the right wall part 44 in the vertical direction are set larger than those of the upper wall part 41 and the lower wall part 42 in the right and left direction, and the left crush can 4 has an approximately rectangular cross-section that is long in the vertical direction as a whole. The dimensions of the upper wall part 41 and the lower wall part 42 of the left crush can 4 in the right and left direction are set approximately equal to those of the upper plate part 21 and the lower plate part 22 of the left front side frame 2 in the right and left direction. Furthermore, the dimensions of the left wall part 43 and the right wall part 44 of the left crush can 4 in the vertical direction are set approximately equal to those of the left plate part 23 and the right plate part 24 of the left front side frame 2 in the vertical direction.

The upper portion of the front end portion of the left crush can 4 is provided with two ridge line portions 4*a* and 4*b* spaced apart from each other in the right and left direction. The lower portion of the front end portion of the left crush can 4 is provided with two ridge line portions 4*c* and 4*d* spaced apart from each other in the right and left direction. The ridge line portions 4*a* to 4*d* are continuous from the front end portion to the rear end portion of the left crush can 4.

Furthermore, the rear edges of the upper wall part 41 and the lower wall part 42 of the left crush can 4 extend in the right and left direction. The rear edges of the left wall part 43 and the right wall part 44 of the left crush can 4 extend in the vertical direction. In this way, a rear end surface of the left crush can 4 is a surface extending in the vertical direction and the right and left direction, and a crush can-side set plate 45 (illustrated only in FIG. 1 to FIG. 3) is fixed to the rear end surface. The crush can-side set plate 45 and the frame-side set plate 25, for example, are fastened by fastening members such as bolts 100 and nuts 101.

The outer shape of the front end portion of the left front side frame 2 and the outer shape of the rear end portion of the left crush can 4 approximately coincide with each other. In this way, when viewed from the vehicle front and rear direction, the ridge line portions 2a to 2d formed at four portions of the front end portion of the left front side frame 2 and the ridge line portions 4a to 4d formed at four portions of the rear end portion of the left crush can 4 overlap each other, and the front end portions of the upper plate part 21, the lower plate part 22, the left plate part 23, and the right plate part 24 of the left front side frame 2 and the rear end portions of the upper wall part 41, the lower wall part 42, the left wall part 43, and the right wall part 44 of the left crush can 4 overlap each other.

As illustrated in FIG. 3, since the set plates 25 and 45 are interposed between the left front side frame 2 and the left crush can 4, the left front side frame 2 and the left crush can 4 do not contact with each other, but when viewed from the vehicle front and rear direction, the front end portions of the plate parts 21 to 24 of the left front side frame 2 and the rear end portions of the wall parts 41 to 44 of the left crush can 4 are in a positional relation so as to overlap each other. Furthermore, when viewed from the vehicle front and rear direction, the front end portions of the plate parts 21 to 24 of the left front side frame 2 and the rear end portions of the wall parts 41 to 44 of the left crush can 4 do not have to completely overlap each other, and a deviation corresponding to a half of the plate thickness is permitted.

Figure 7:
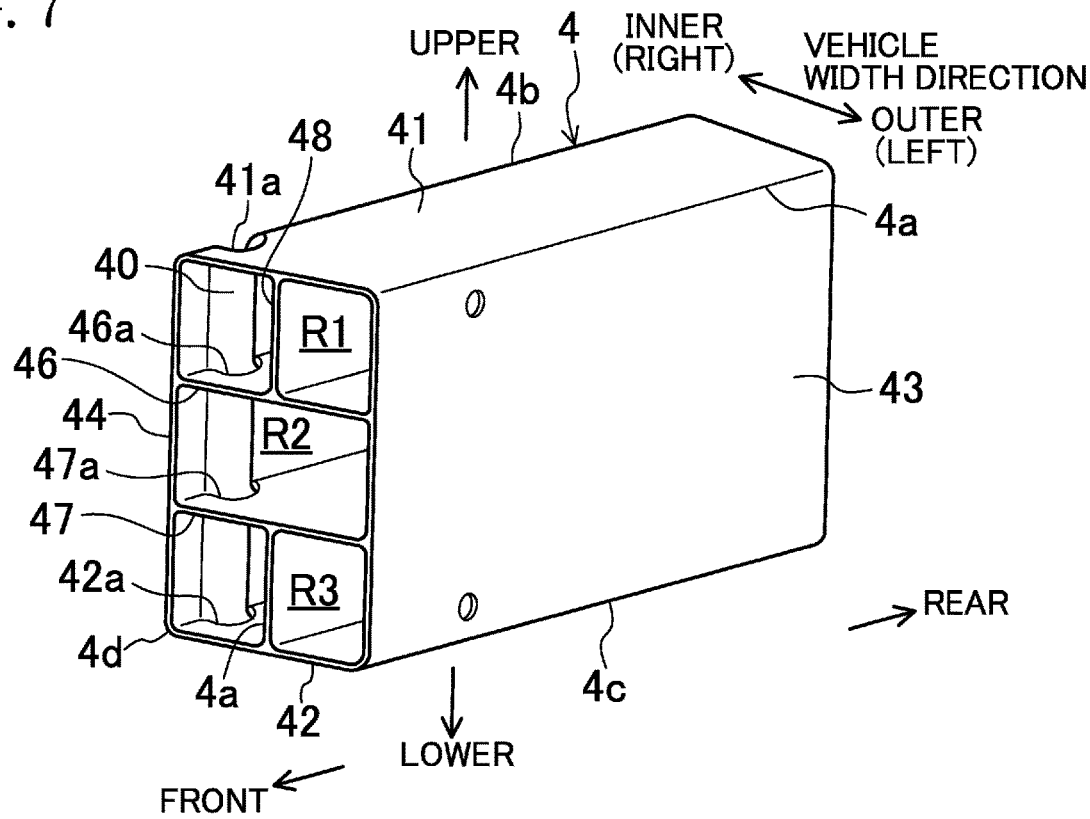
FIG. 7 is a perspective view when the left crush can is viewed from the upper left.
Figure 8:
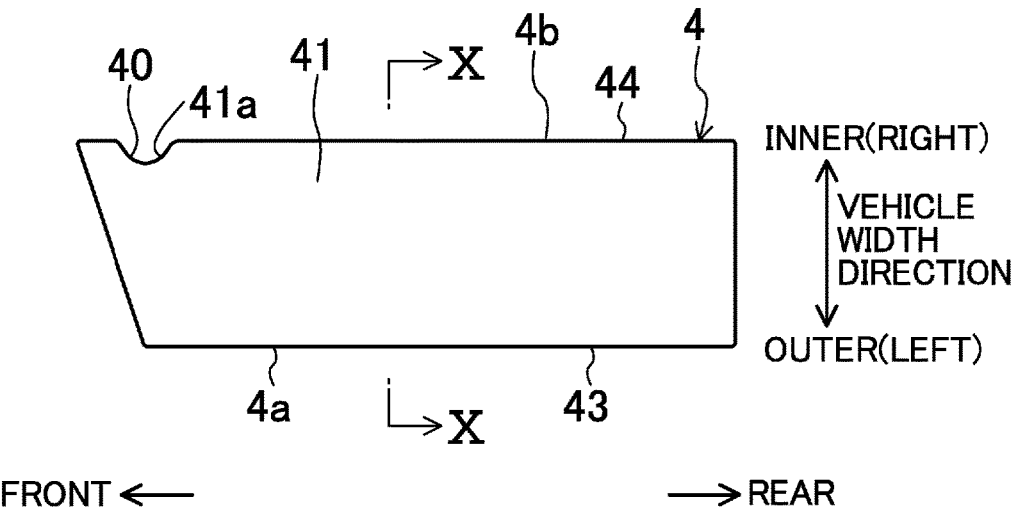
FIG. 8 is a plan view of the left crush can.
Figure 9:
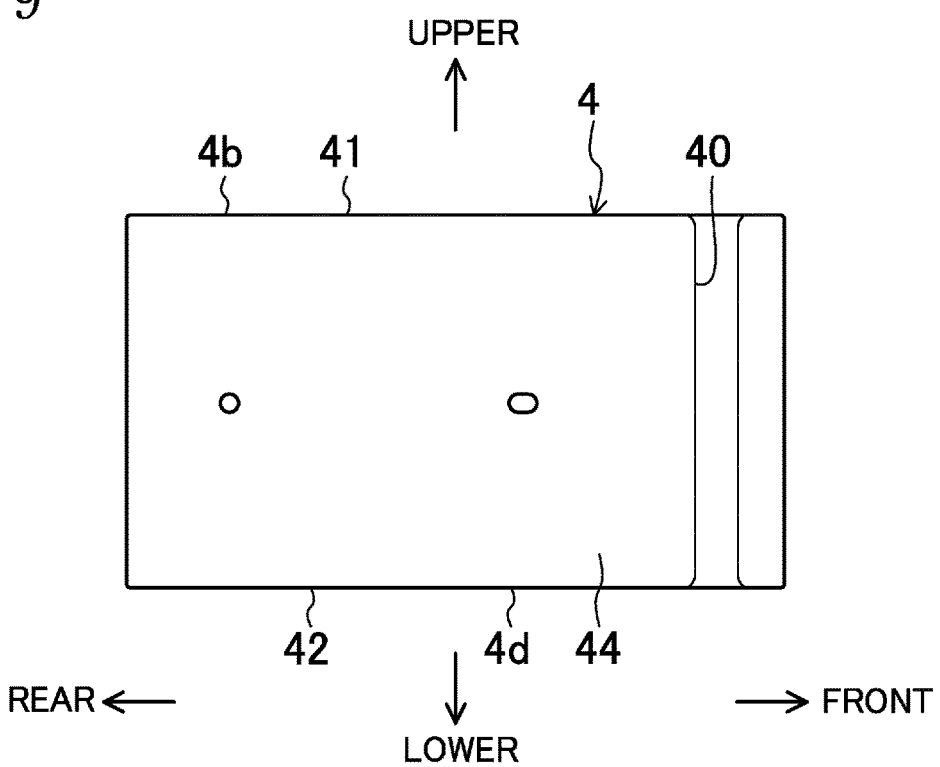
FIG. 9 is a right side view of the left crush can.

On the other hand, as illustrated in FIG. 7 and FIG. 8, the front edges of the upper wall part 41 and the lower wall part 42 of the left crush can 4 extend in the right and left direction while being inclined with a predetermined inclination angle with respect to the right and left direction so as to be located rearward toward the left side. In this way, the front edge of the left wall part 43 of the left crush can 4 is located behind the front edge of the right wall part 44. The front edges of the upper wall part 41 and the lower wall part 42 are shaped to conform to a shape of the bumper beam 6 to be described later. Furthermore, the front edges of the upper wall part 41 and the lower wall part 42 of the left crush can 4 may curve and extend so as to be located rearward toward the left side. Furthermore, the front edges of the left wall part 43 and the right wall part 44 of the left crush can 4 extend in the vertical direction.

Figure 10:
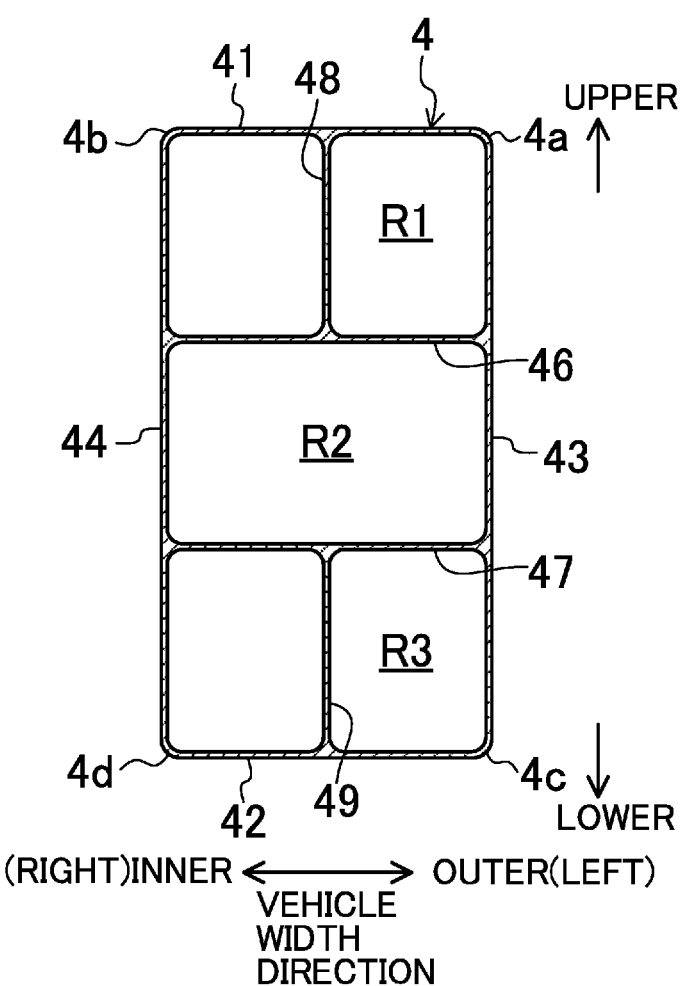
FIG. 10 is a cross-section taken along line X-X in FIG. 8.

As illustrated in FIG. 7 and FIG. 10, the left crush can 4 is provided therein with the upper horizontal wall part 46 and the lower horizontal wall part 47 extending from the right wall part 44 to the left wall part 43 and spaced apart from each other in the vertical direction, an upper vertical wall part 48 extending from the upper wall part 41 to the upper horizontal wall part 46 in the vertical direction, and a lower vertical wall part 49 extending from the lower wall part 42 to the lower horizontal wall part 47 in the vertical direction. That is, the upper horizontal wall part 46 extends in the right and left direction from a part, above the vertical center, of the right wall part 44 to a part, above the vertical center, of the left wall part 43, and extends from the front end portion to the rear end portion of the left crush can 4 approximately in parallel to the upper wall part 41. The lower horizontal wall part 47 extends in the right and left direction from a part, below the vertical center, of the right wall part 44 to a part, below the vertical center, of the left wall part 43, and extends from the front end portion to the rear end portion of the left crush can 4 approximately in parallel to the lower wall part 42. By the upper horizontal wall part 46 and the lower horizontal wall part 47, the inside of the left crush can 4 is divided into three spaces in the vertical direction, that is, an upper space R1, a center space R2, and a lower space R3. In the embodiment, the dimensions of the upper space R1, the center space R2, and the lower space R3 in the vertical direction are set to be approximately equal to one another.

The heights of the upper horizontal wall part 46 and the lower horizontal wall part 47 are set approximately equal to those of the outer recessed linear portion 23a and the inner recessed linear portion 24a of the left front side frame 2. Specifically, the height of the upper horizontal wall part 46 is set to approximately the same heights as the upper portion 23b constituting the outer recessed linear portion 23a and the upper portion 24b constituting the inner recessed linear portion 24a. The height of the lower horizontal wall part 47 is set to approximately the same heights as the lower portion 23c constituting the outer recessed linear portion 23a and the lower portion 24c constituting the inner recessed linear portion 24a.

The upper vertical wall part 48 extends in the vertical direction from the center of the upper wall part 41 in the right and left direction to the center of the upper horizontal wall part 46 in the right and left direction, and extends from the front end portion to the rear end portion of the left crush can 4 approximately in parallel to both the right and left wall parts 44 and 43. By the upper vertical wall part 48, the upper space R1 is divided into two spaces in the right and left direction. The lower vertical wall part 49 extends in the vertical direction from the center of the lower wall part 42 in the right and left direction to the center of the lower horizontal wall part 47 in the right and left direction, and extends from the front end portion to the rear end portion of the left crush can 4 approximately in parallel to both the right and left wall parts 44 and 43. By the lower vertical wall part 49, the lower space R3 is divided into two spaces in the right and left direction.

The upper wall part 41 and the lower wall part 42 have approximate the same thickness, and the left wall part 43 and the right wall part 44 also have approximate the same thickness. Moreover, the upper horizontal wall part 46 and the lower horizontal wall part 47 have approximate the same thickness, and the upper vertical wall part 48 and the lower vertical wall part 49 also have approximate the same thickness.

Figure 6:
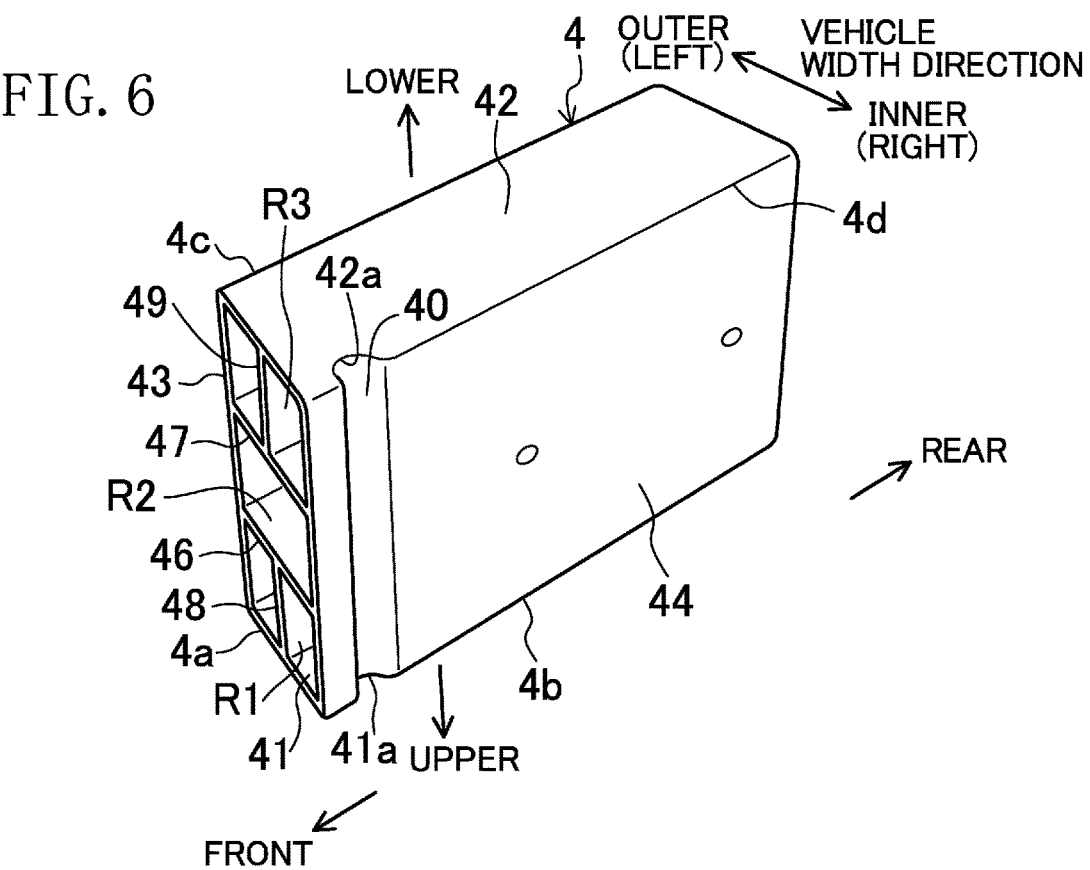
FIG. 6 is a perspective view when a left crush can is viewed from the lower right.

The left crush can 4 is provided with an induction part 40 for inducing crushing when a compressive load acts in the front and rear direction. The induction part 40 includes a bead formed to be recessed to the left in a position separated rearward from the front end portion of the right wall part 44 at the front portion of the right wall part 44, and extends from an upper end portion to a lower end portion of the right wall part 44. A horizontal cross-section of the induction part 40 is a shape of substantially circular arc opened rightward. Since the induction part 40 is a groove-like part, a part of right edges of the upper wall part 41 and the lower wall part 42 is cut out, so that cutout portions 41a and 42a are formed in the upper wall part 41 and the lower wall part 42 as illustrated in FIG. 6. Similarly, a part of right edges of the upper horizontal wall part 46 and the lower horizontal wall part 47 is cut out, so that cutout portions 46a and 47a are formed in the upper horizontal wall part 46 and the lower horizontal wall part 47 as illustrated in FIG. 7. On the other hand, the left wall part 43 of the left crush can 4 is provided with no induction part. The induction part 40 may be omitted.

(Configuration of Bumper Beam)

Figure 11:
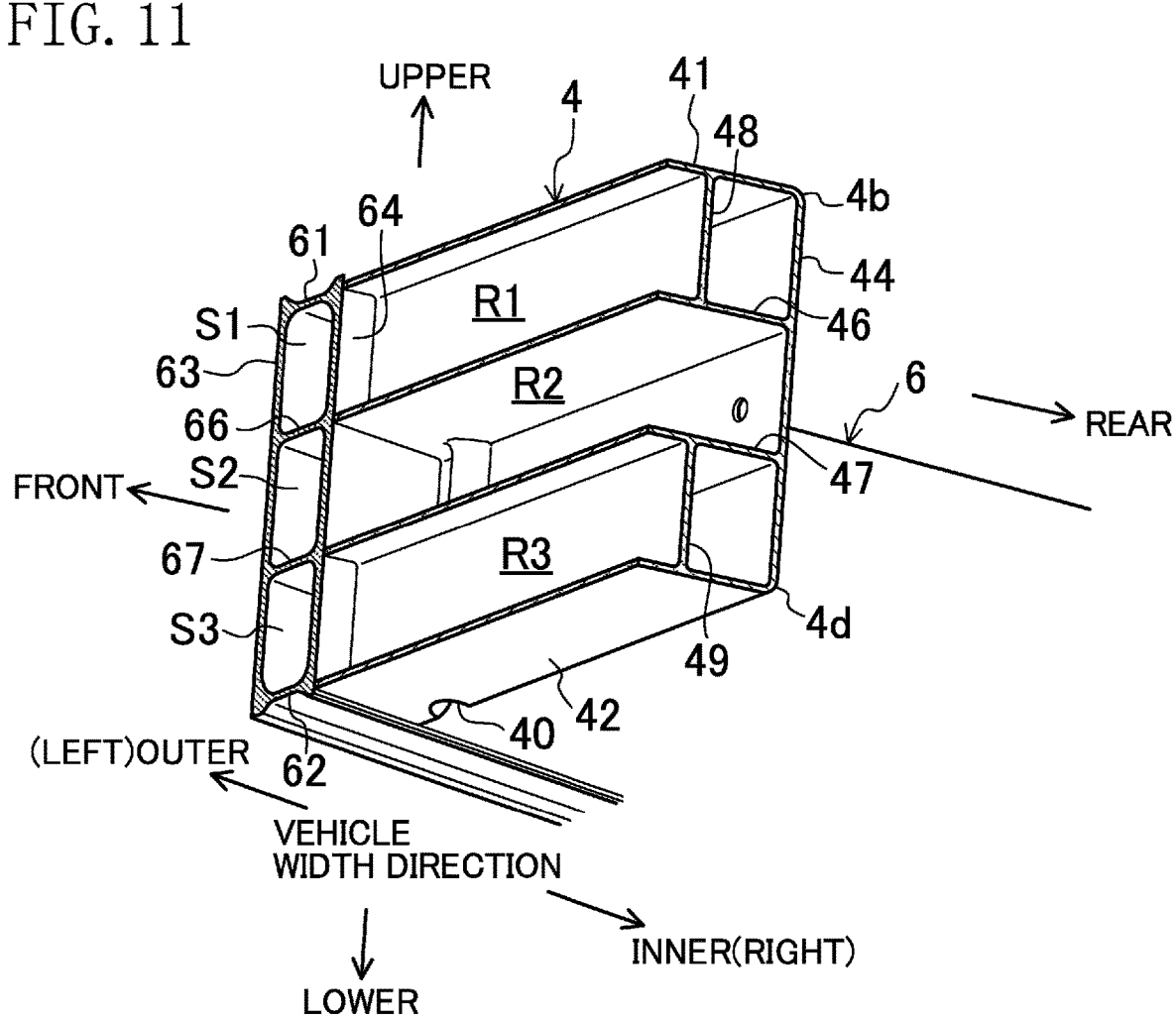
FIG. 11 is a cross-section taken along line XI-XI in FIG. 1.
Figure 12:
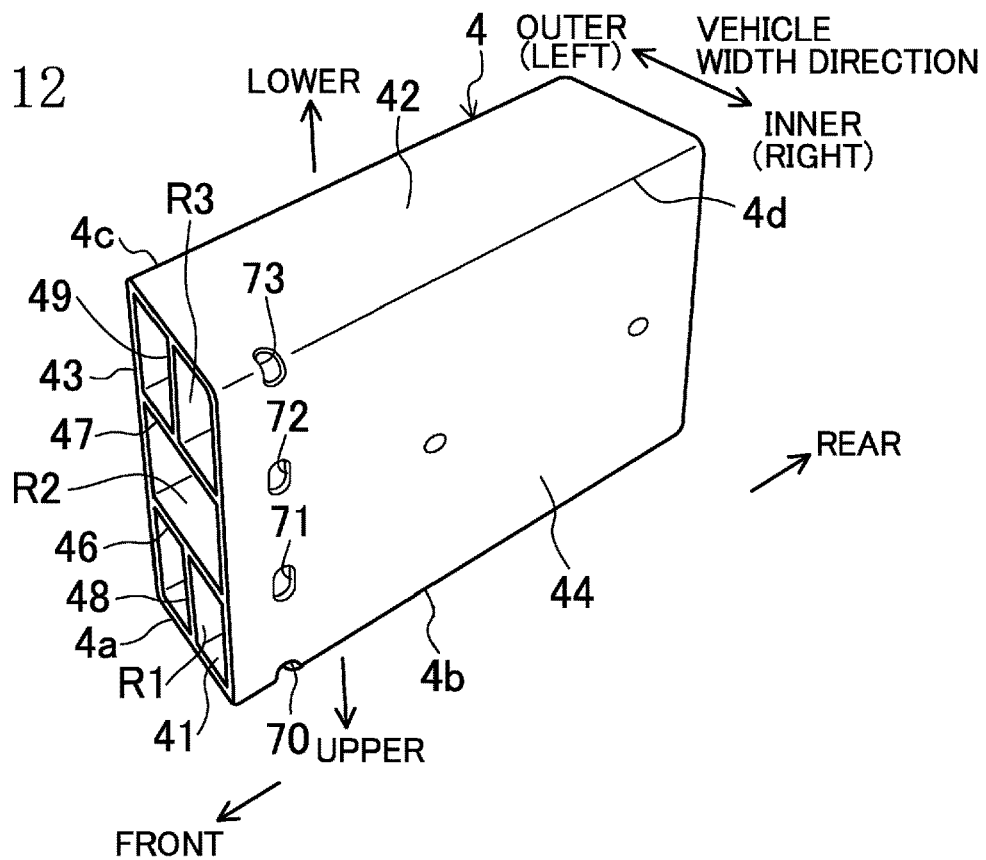
FIG. 12 is a view corresponding to FIG. 6 according to a modification example 1 of the embodiment.
Figure 13:
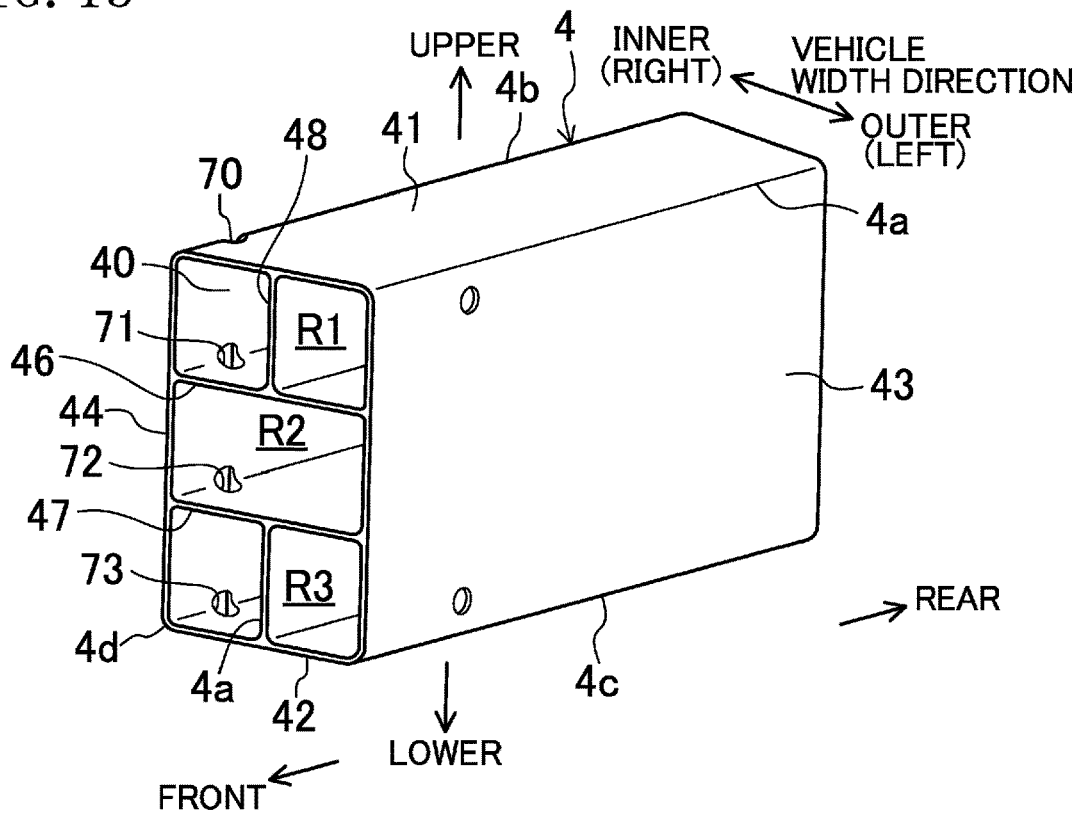
FIG. 13 is a view corresponding to FIG. 7 according to the modification example 1 of the embodiment.
Figure 14:
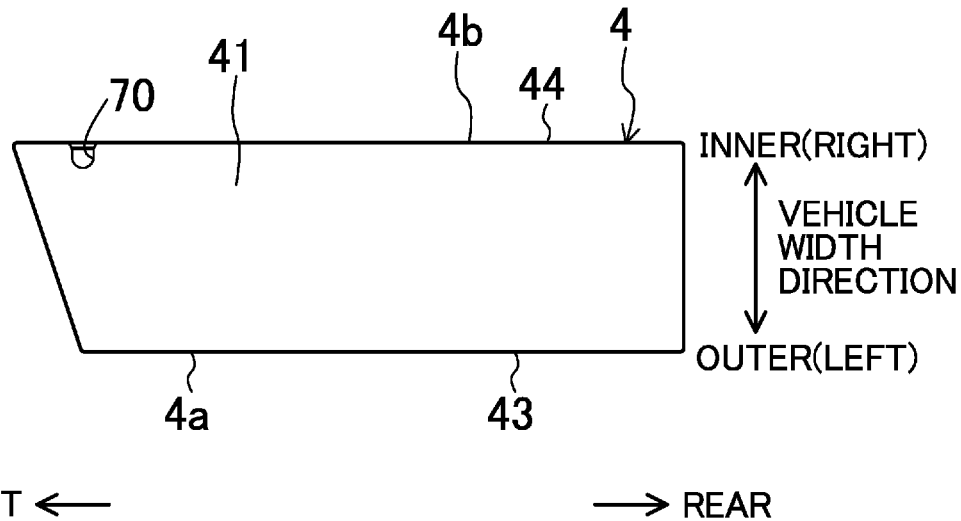
FIG. 14 is a view corresponding to FIG. 8 according to the modification example 1 of the embodiment.
Figure 15:
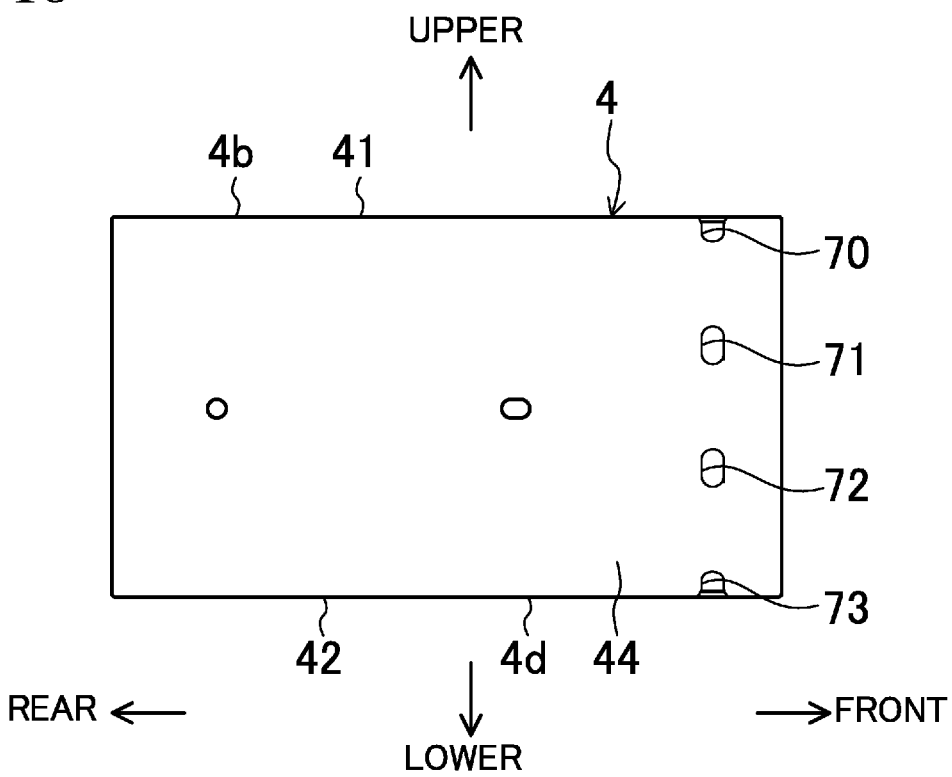
FIG. 15 is a view corresponding to FIG. 9 according to the modification example 1 of the embodiment.
Figure 16:
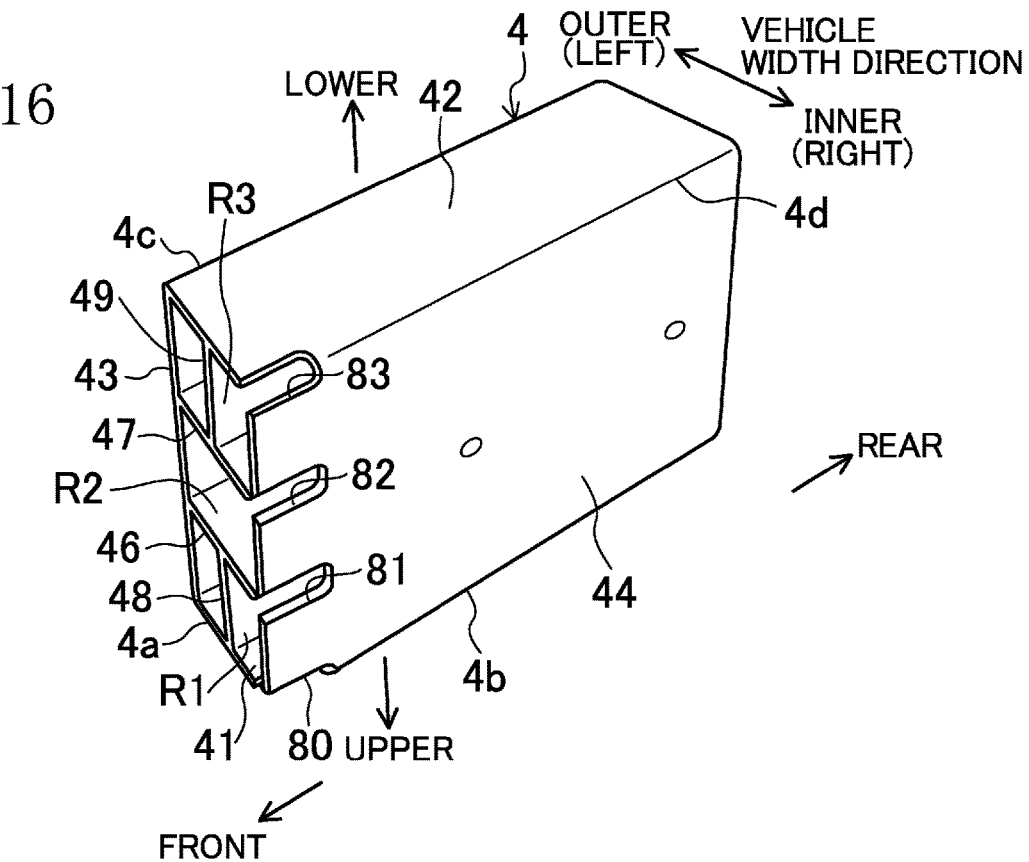
FIG. 16 is a view corresponding to FIG. 6 according to a modification example 2 of the embodiment.
Figure 17:
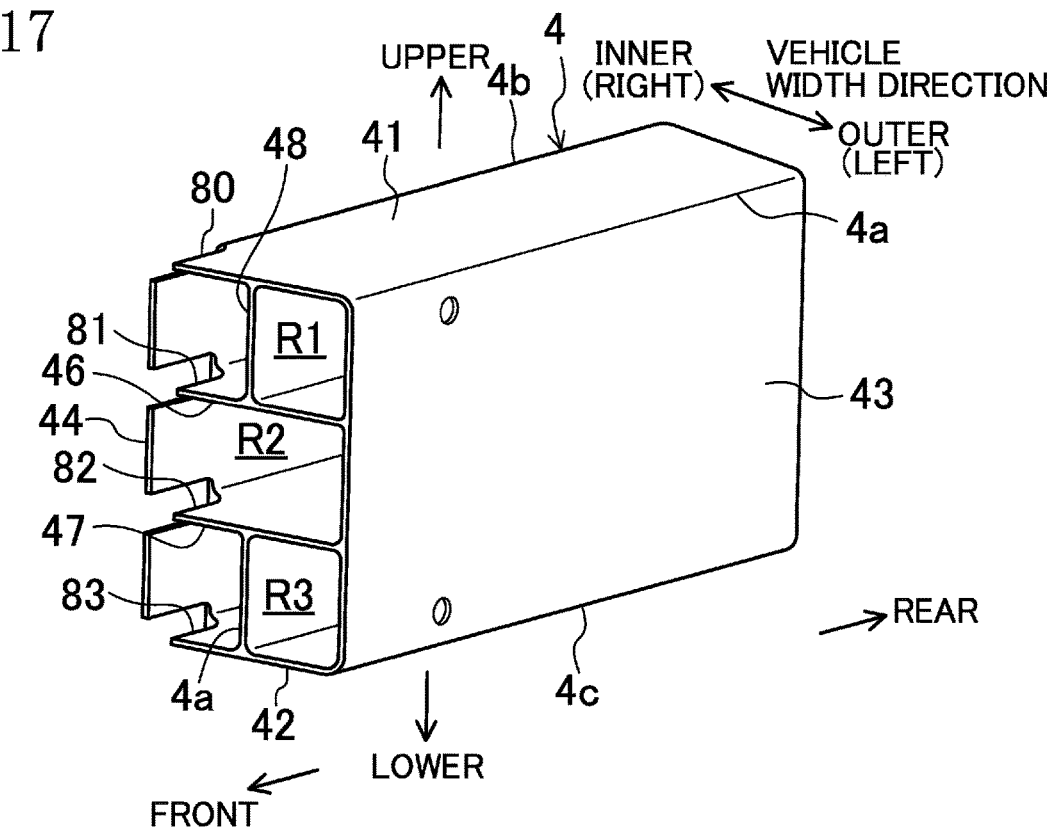
FIG. 17 is a view corresponding to FIG. 7 according to the modification example 2 of the embodiment.
Figure 18:
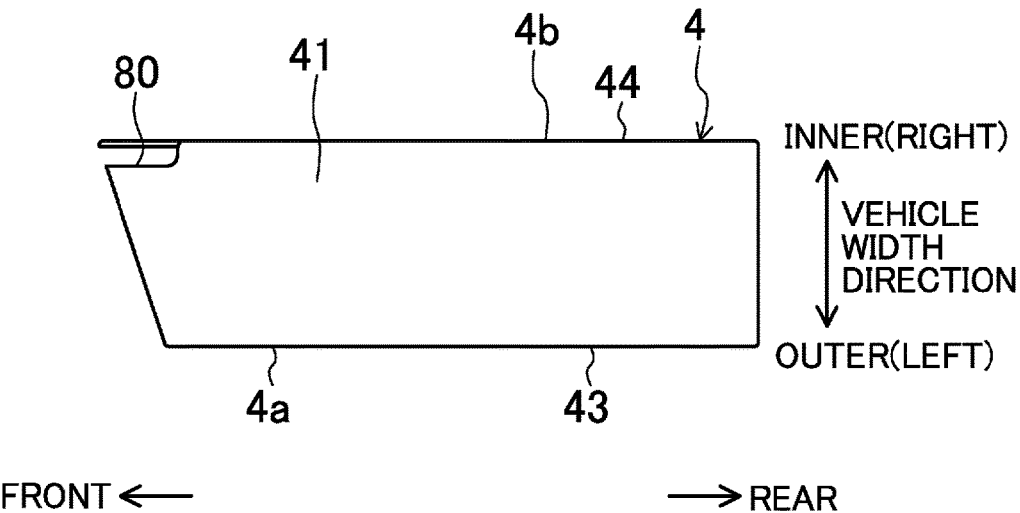
FIG. 18 is a view corresponding to FIG. 8 according to the modification example 2 of the embodiment.
Figure 19:
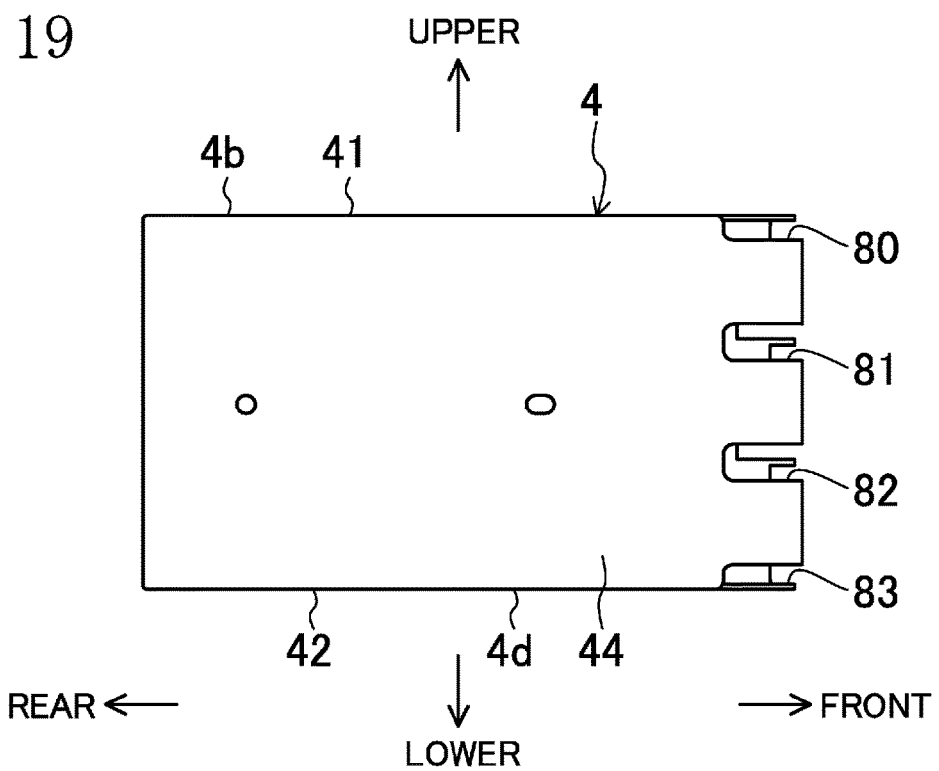
FIG. 19 is a view corresponding to FIG. 9 according to the modification example 2 of the embodiment.

As illustrated in FIG. 1 and FIG. 11, the bumper beam 6 has an upper plate part 61 and a lower plate part 62 extending in the right and left direction while being separated from each other in the vertical direction, a front plate part 63 extending in the vertical direction to connect the front end portions of the upper plate part 61 and the lower plate part 62 to each other, and a rear plate part 64 extending in the vertical direction to connect the rear end portions of the upper plate part 61 and the lower plate part 62 to each other, and has an approximately rectangular cross-section as a whole. The dimensions of the front plate part 63 and the rear plate part 64 in the vertical direction are set larger than those of the upper plate part 61 and the lower plate part 62 in the right and left direction.

Figure 2:
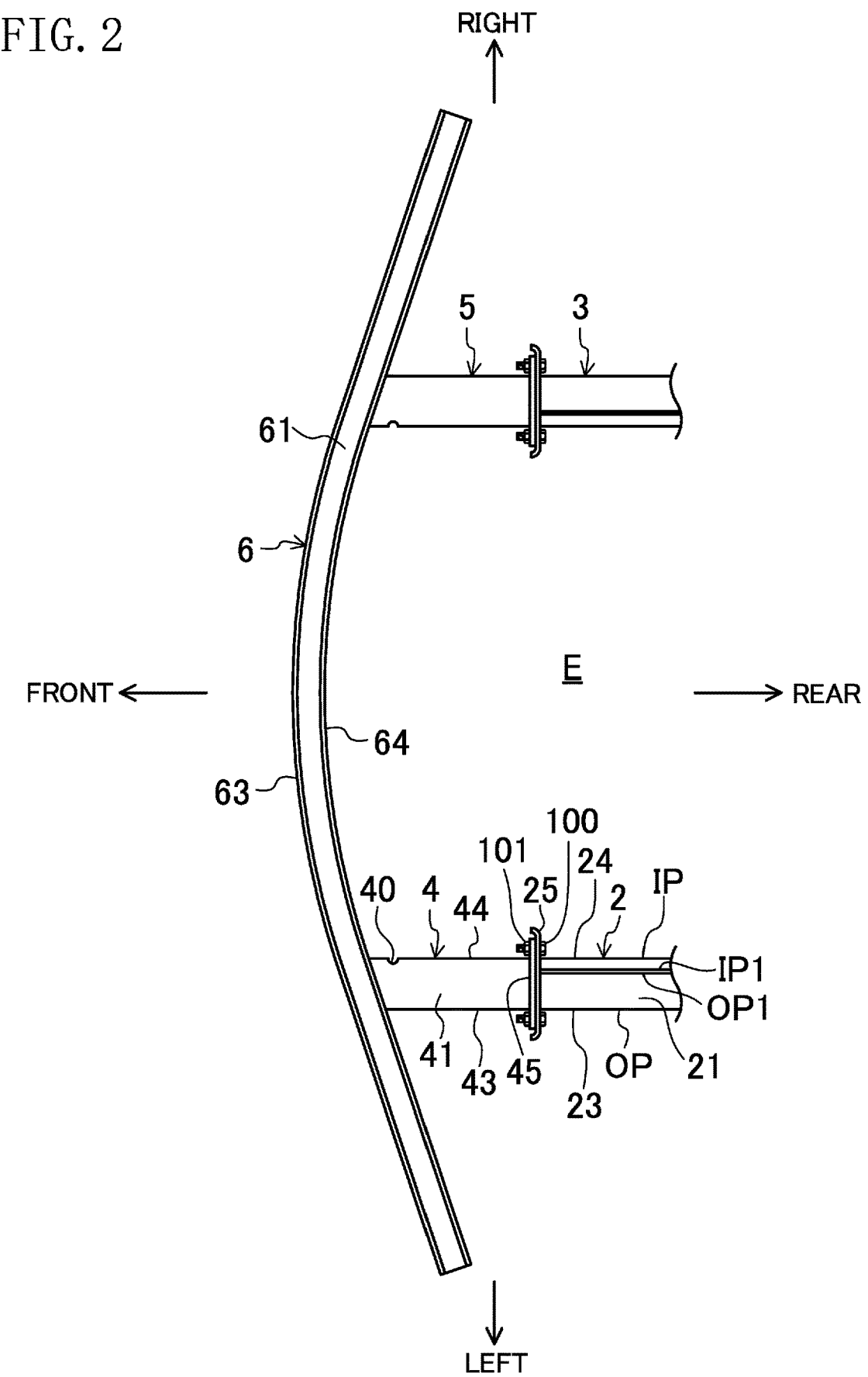
FIG. 2 is a plan view illustrating a front part of the impact absorption structure for the vehicle.

Similar to the crush cans 4 and 5, the bumper beam 6 can also be formed into an extrusion molding member; however, the present disclosure is not limited thereto and the bumper beam 6 may be configured with a press-molded plate material. The bumper beam 6 is formed to curve as a whole in the plan view as illustrated in FIG. 2 and has a shape in which both sides of the bumper beam 6 in the vehicle width direction are located closer to the rear side as getting closer to the outer sides in the vehicle width direction, that is, the bumper beam 6 has a shape in which the center in the vehicle width direction is located at the frontmost position. Such a shape of the bumper beam 6 is decided from a relation of vehicle design. Furthermore, the bumper beam 6 may have an inclined shape in the plan view such that it is located on the rear side toward the outer side in the vehicle width direction.

As illustrated in FIG. 1 and FIG. 11, the bumper beam 6 is provided therein with an upper horizontal plate portion 66 and a lower horizontal plate portion 67 extending from the front plate part 63 to the rear plate part 64 and spaced apart from each other in the vertical direction. The upper horizontal plate portion 66 extends in front and rear direction from a part above the vertical center, of the front plate part 63, to a part, above the vertical center, of rear plate part 64. The upper horizontal plate portion 66 extends from the left end portion to the right end portion of the bumper beam 6 approximately in parallel to the upper plate part 61. The lower horizontal plate portion 67 extends in the front and rear direction from a part below the vertical center, of the front plate part 63, to a part, below the vertical center, of the rear plate part 64. The lower horizontal plate portion 67 extends from the left end portion to the right end portion of the bumper beam 6 approximately in parallel to the lower plate part 62.

By the upper horizontal plate portion 66 and the lower horizontal plate portion 67, the inside of the bumper beam 6 is divided into three spaces in the vertical direction, that is, an upper space S1, a center space S2, and a lower space S3. In the embodiment, the dimensions of the upper space S1, the center space S2, and the lower space S3 in the vertical direction are set to be approximately equal to one another. The heights of the upper horizontal plate portion 66 and the lower horizontal plate portion 67 approximately coincide with those of the upper horizontal wall part 46 and the lower horizontal wall part 47 of the left crush can 4, respectively.

Furthermore, the thicknesses of the front plate part 63 and the rear plate part 64 are approximately equal to each other, and are set thicker than those of the upper plate part 61, the lower plate part 62, the upper horizontal plate portion 66, and the lower horizontal plate portion 67. The thicknesses of the upper plate part 61, the lower plate part 62, the upper horizontal plate portion 66, and the lower horizontal plate portion 67 are approximately equal to one another.

Advantages of Embodiment

Next, the advantages of the impact absorption structure 1 of the vehicle configured as above will be described. A description will be provided for a case where an impact load of a predetermined degree or less is applied from the front such as when the vehicle collides head on at a low vehicle speed (for example, 15 km/h or less) (light collision). The impact load from the front is applied to the bumper beam 6 via a front bumper and the like (not illustrated), and compressive force acts from the bumper beam 6 to the left crush can 4 and the right crush can 5. Depending on the collision situation, there are a case where the compressive force acts only on the left crush can 4 and a case where the compressive force acts only on the right crush can 5.

Since the left crush can 4 and the right crush can 5 are attached to the left front side frame 2 and the right front side frame 3, they receive the compressive force between the bumper beam 6 and the left front side frame 2 and between the bumper beam 6 and the right front side frame 3, respectively. In such a case, the ridge line portions 2a and 2b are formed at the upper portion of the front end portion of the left front side frame 2, the ridge line portions 2c and 2d are formed at the lower portion thereof, and two portions having a strength higher than that of a flat plate portion are present at the upper portion and the lower portion of the front end portion of the left front side frame 2, respectively, so that the strength of the upper portion and the lower portion of the front end portion of the left front side frame 2 is increased.

On the other hand, similar to the front end portion of the left front side frame 2, since the ridge line portions 4a to 4d are formed at the upper portion and the lower portion of the left crush can 4, the strength of the upper portion and the lower portion of the left crush can 4 is increased. Moreover, the strength of the upper portion of the left crush can 4 is further increased by the upper horizontal wall part 46 and the upper vertical wall part 48, and the strength of the lower portion of the left crush can 4 is also further increased by the lower horizontal wall part 47 and the lower vertical wall part 49.

Furthermore, the front end portions of the plate parts 21 to 24 of the left front side frame 2 and the rear end portions of the wall parts 41 to 44 of the left crush can 4 overlap each other, thereby obtaining a positional relation in which a high-strength portion of the upper portion of the left front side frame 2 and a high-strength portion of the upper portion of the left crush can 4 correspond to each other and a positional relation in which a high-strength portion of the lower portion of the left front side frame 2 and a high-strength portion of the lower portion of the left crush can 4 correspond to each other.

In this way, when an impact load is applied to the left crush can 4 via the bumper beam 6, since the rear end portion of the left crush can 4 can be firmly and stably supported at the front end portion of the left front side frame 2, a plurality of cores are not required as in the related art and the left crush can 4 is prevented from being displaced in an unexpected direction, so that the left crush can 4 is crushed and deformed between the bumper beam 6 and the left front side frame 2 to exhibit expected energy absorption performance. The same is also true to the right crush can 5.

When the left crush can 4 is crushed and deformed, since the induction part 40 is provided at the front portion of the right wall part 44 of the left crush can 4, the right front portion of the left crush can 4 begins to be crushed and deformed and then the other portions begin to be crushed and deformed. In this way, the right side and the left side of the left crush can 4 can be crushed at the same timing, so that it is possible to absorb energy by using the entire left crush can 4.

Furthermore, for example, when a collision load is applied to the intermediate portion of the bumper beam 6 in the vehicle width direction, the crushing and deforming of the right wall part 44 of the left crush can 4 is induced by the induction part 40, so that it is possible to reduce the load transmitted to the inside of the left front side frame 2 in the vehicle width direction via the right wall part 44. In this way, the deformation of the inside of the left front side frame 2 in the vehicle width direction is reduced. The same is also true to the right crush can 5.

As a consequence, the deformation of the left front side frame 2 and the right front side frame 3 at the time of a light collision is reduced.

Other Embodiments

The aforementioned embodiment is only a simple example in all respects and it should be noted that it is not construed in a manner limited by the example. Moreover, all modifications and changes belonging to equivalents of the claims are considered to fall within the scope of the present invention.

As in a modification example 1 illustrated in FIG. 12 to FIG. 15 and a modification example 2 illustrated in FIG. 16 to FIG. 19, a plurality of cutout portions 70 to 73 and 80 to 83 may be provided at the right side of the left crush can 4 by cutting off a part of a material. The cutout portions 70 to 73 and 80 to 83 of the modification examples 1 and 2 are provided at the front part of the left crush can 4 and operate similarly to the aforementioned induction part 40.

The cutout portions 70 to 73 of the modification example 1 are located at portions separated from the front end portion of the right wall part 44 to the rear side, are provided spaced apart from each other in the vertical direction, and serve as through holes. The upper and lower two cutout portions 70 and 73 are formed in the ridge line portions 4a and 4c, respectively. The intermediate two cutout portions 71 and 72 are provided continuously to the right end portions of the upper horizontal wall part 46 and the lower horizontal wall part 47, respectively.

Furthermore, the cutout portions 80 to 83 of the modification example 2 are provided spaced apart from each other in the vertical direction, and are notches formed by cutting off a predetermined range from the front end portion of the right wall part 44 to the rear side. The upper and lower two cutout portions 80 and 83 are formed in the ridge line portions 4a and 4c, respectively. The intermediate two cutout portions 81 and 82 are provided by continuous cutting to the right end portions of the upper horizontal wall part 46 and the lower horizontal wall part 47, respectively.

In the modification examples 1 and 2, the four cutout portions 70 to 73 and the four cutout portions 80 to 83 are provided; however, the present disclosure is not limited thereto and the number of cutout portions may be 3 or less or 5 or more.

The aforementioned embodiment has described a case where the left front side frame 2 and the right front side frame 3 are configured with a press-molded plate material;

however, the present disclosure is not limited thereto and the left front side frame 2 and the right front side frame 3 may be configured with an extrusion molding member.

INDUSTRIAL APPLICABILITY

As described above, the impact absorption structure for the vehicle according to the present invention, for example, can be provided at the front part of a passenger vehicle.

DESCRIPTION OF REFERENCE CHARACTERS

1 Impact absorption structure for Vehicle
2, 3 Front Side Frame
2a, 2b, 2c, 2d Ridge Line Portion
4, 5 Crush Can
4a, 4b, 4c, 4d Ridge Line Portion
6 Bumper Beam
21 Upper Plate Part
22 Lower Plate Part
23 Left Plate Part
23a Outer Recessed Linear Portion
24 Right Plate Part
24a Inner Recessed Linear Portion
41 Upper Wall Part
42 Lower Wall Part
43 Left Wall Part
44 Right Wall Part

The invention claimed is:

1. An impact absorption structure for a vehicle in which right and left crush cans are respectively attached to vehicle front end portions of front side frames disposed on both right and left sides of the vehicle and extending in a vehicle front and rear direction, and a bumper beam is attached to vehicle front end portions of the right and left crush cans to extend in a vehicle width direction, wherein each of the crush cans includes an extrusion molding member having an upper wall part and a lower wall part extending in a vehicle right and left direction while being separated from each other in a vertical direction, a left wall part extending in the vertical direction to connect vehicle left end portions of the upper wall part and the lower wall part to each other, and a right wall part extending in the vertical direction to connect vehicle right end portions of the upper wall part and the lower wall part to each other, the crush can is provided therein with an upper horizontal wall part and a lower horizontal wall part extending from the right wall part to the left wall part and spaced apart from each other in the vertical direction, an upper vertical wall part extending from the upper wall part to the upper horizontal wall part in the vertical direction, and a lower vertical wall part extending from the lower wall part to the lower horizontal wall part in the vertical direction, the front side frame is provided at the front end portion thereof with an upper plate part and a lower plate part extending in the vehicle right and left direction while being separated from each other in the vertical direction, a left plate part extending in the vertical direction to connect vehicle left end portions of the upper plate part and the lower plate part to each other, and a right plate part extending in the vertical direction to connect vehicle right end portions of the upper plate part and the lower plate part to each other, when viewed from the vehicle front direction or the vehicle rear direction, the vehicle front end portions of the upper plate part, the lower plate part, the left plate part, and the right plate part of the front side frame overlap with respective vehicle rear end portions of the upper wall part, the lower wall part, the left wall part, and the right wall part of the crush can, vertical intermediate portions of the left plate part and the right plate part of the front side frame are provided with recessed linear portions recessed toward an inner side of the front side frame and extending in the vehicle front and rear direction, and the recessed linear portions are disposed at an approximately the same height as the upper horizontal wall part and the lower horizontal wall part of the crush can.

2. The impact absorption structure for the vehicle of claim 1, wherein the front end portion of the front side frame and a rear end portion of the crush can have an approximately rectangular cross-section extending in the vertical direction, and when viewed from the vehicle front and rear direction, ridge line portions formed at four portions of the front end portion of the front side frame and ridge line portions formed at four portions of the rear end portion of the crush can overlap each other.

3. The impact absorption structure for the vehicle of claim 1, wherein an outer shape of the vehicle front end portion of the front side frame and an outer shape of a vehicle rear end portion of the crush can approximately coincide with each other.

* * * * *